Oct. 10, 1967     W. D. LUDWIG     3,346,277

LOCKING DEVICE

Filed July 15, 1964

INVENTOR.

WALTER D. LUDWIG

BY Donnelly, Mentag & Harrington

ATTORNEYS

United States Patent Office 3,346,277
Patented Oct. 10, 1967

3,346,277
LOCKING DEVICE
Walter D. Ludwig, Bloomfield Township, Oakland County, Mich., assignor to Mac Valves, Inc., Oak Park, Mich., a corporation of Michigan
Filed July 15, 1964, Ser. No. 382,759
5 Claims. (Cl. 285—308)

This invention relates to locking devices, and more particularly, to a mechanical locking device particularly adapted to lock a pair of concentric generally cylindrical members together, as for example to lock a solenoid cover on a valve body.

Locking devices for locking a pair of concentric cylindrical members together are well known in the art. These known devices, however, exhibit numerous disadvantages. For example, certain locking devices are subject to becoming accidentally unlocked. Other devices are difficult to lock and unlock. Still other devices have either a positive locking action or a positive unlocking action. Still further, these devices are relatively complex and expensive. Accordingly, it is an object of this invention to provide an improved locking device for locking a pair of concentric substantially cylindrical members together.

Another object of this invention is to provide an improved locking device for a pair of concentric cylindrical members which exhibits both a positive locking and a positive unlocking action.

It is a further object of this invention to provide a locking device for a pair of valve members having concentric cylindrical portions which device precludes accidential unlocking yet is easily locked and unlocked.

Still another object of this invention is to provide a locking device for locking a pair of substantially cylindrical portions in engagement with each other in which the locking device contains a minimum of parts and yet provides positive locking action and can be quickly and easily unlocked.

Yet a further object of this invention is to provide a locking device for a pair of substantially cylindrical concentric sections in which the device can be quickly and easily locked and unlocked by the rotation of a single screw while providing extensive linear contact between the locking device and one of the cylindrical members at substantially equally spaced peripheral portions.

Briefly, in accordance with aspects of this invention, I have discovered that two concentric substantially cylindrical protions of two members can be securely locked together with a positive locking action and can be quickly and easily unlocked by means of a simple arrangement of a substantially C-shaped element positioned between the members to provide a camming action and means coupled intermediate the ends of the C-shaped element for applying a radial force to the C-shaped element. Preferably this force is applied to the centrol portion of the element. In accordance with one aspect of this invention, I mount a C-shaped cam element in a slot on the inner surface of a first cylindrical portion and employ a threaded device coupled to the C-shaped element and rotatably mounted in the first cylindrical portion for moving the C-shaped element radially relative to a concentric second cylindrical member positioned within the first concentric cylindrical member such that the C-shaped member securely engages the inner cylindrical member at spaced circumferential intervals.

In accordance with one embodiment of this invention, I provide a first cylindrical member having a circular slot on the inner surface eccentric with the center of curvature of the member, a C-shaped member having a depending, substantially flat tongue projecting radially from the central portion of the C-shaped member in a direction opposite the center of curvature and having grooves thereon to engage a threaded member, and, rotatably mount a threaded member in an aperture in the first cylindrical member in a position threadably to engage the tongue wherein rotation of the threaded member positively translates the C-shaped member radially and bidirectionally relative to the inner cylindrical member thus securely to engage the inner cylindrical member in both a positive locking and a positive unlocking action. In accordance with yet another aspect of this invention, I provide, in the first cylindrical member, a C-shaped cam member, a threaded member coupled to the cam member and a locking device for locking the threaded member against longitudinal movement whereby the threaded member engages a threaded portion or extension of the C-shaped member such that rotation of the threaded member in a first direction translates or cams the C-shaped member in a first radial direction toward the inner cylindrical member and rotation of the threaded member in the opposite direction translates the C-shaped member in the opposite radial direction to provide a positive locking and a positive unlocking action relative to the inner cylindrical member.

In accordance with another illustrative embodiment of this invention, I provide a locking device for a pair of concentric cylindrical members which includes a C-shaped member slidably mounted in a circular slot on the inner surface of the first or outer member, a pair of camming surfaces in the circular slot adjacent the open ends or tips of the C-shaped member and a threaded member threadably engaging a threaded port in the outer cylindrical member and engaging the periphery of the C-shaped member for forcing the C-shaped member radially inwardly to cause the ends of the C-shaped member to engage the camming surfaces which in turn force the ends of the C-shaped member inwardly toward and into positive engagement with a flange on the inner or second cylindrical member. The resilient action of the C-shaped member against the camming surfaces provides an unlocking action to force the C-shaped member away from the flange of the second cylindrical member when the threaded member is rotated in the opposite direction such that the peripheral force on the C-shaped member is removed.

These and various other objects and features of the invention will be more clearly understood from a reading of the detailed description of the invention in conjunction with the drawings, in which.

Figure 2:
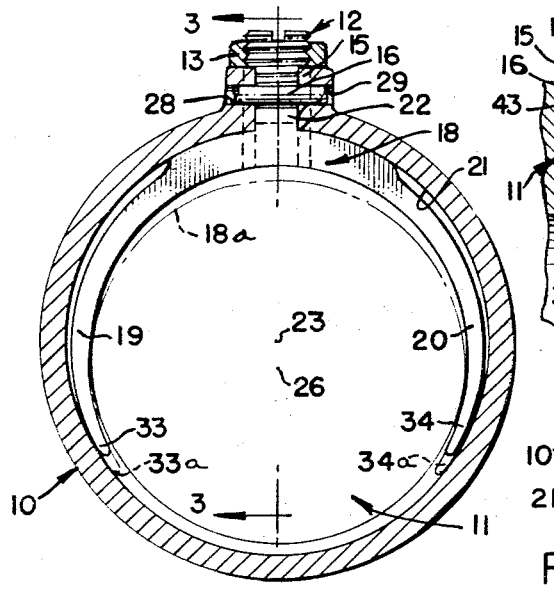
FIG. 2 is a view in section taken along the lines 2—2 of FIG. 1.
Figure 1:
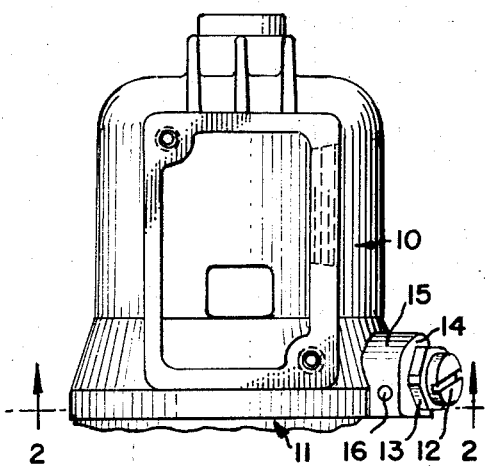
FIG. 1 is a view in elevation of an outer substantially cylindrical member comprising a valve solenoid cover and a portion of the locking device by which this outer cylindrical member is locked to an inner cylindrical member comprising a valve body.

FIG. 1 is a view in elevation of a solenoid cover 10 which is to be secured to a valve body 11 by means of a locking device which includes a threaded member or screw 12 and the locking nut 13 which threadably engages the threaded member 12 and frictionally engages a surface 14 on a screw housing 15 of the cover 10. The threaded member 12 is retained in the screw housing 15 by means of a locking pin 16 but which permits the screw to rotate. FIG. 2 is a view in section taken along the lines 2—2 of FIG. 1 and looking in the direction of the arrows.

The locking arrangement shown in detail in FIG. 2 is produced by a combination of elements including a crescent ring 18 slidably mounted in an eccentric, circular slot 21 and having a pair of arcuate arms 19, 20 which extend circumferentially with respect to the slot 21. The crescent ring 18 includes a radially projecting tongue 22 preferably secured to the body of ring 18 in a manner such that the arms 19, 20 are equal in length and the projection or tongue 22 has a threaded, substantially flat surface 24 best seen in FIG. 3 which frictionally engages an inner threaded portion 25 of the threaded member or screw 12. The locking pin 16 engages a circular recess 27 in the screw 12 and engages a pair of axially aligned, circular holes 28, 29 in the housing 15 such that the threaded member 12 is secured against longitudinal movement but is free to rotate with respect to its own axis. The screw 12 includes an outer threaded portion 31 which threadably engages a portion of the housing 15. The lock nut 13 threadably engages the outer threaded portion 31 of the screw 12 and frictionally engages the surface 14 of the screw housing 15, in a manner well known in the art. Each of the arms 19, 20 terminates in a tip 33, 34 respectively, which frictionally engages eccentric slot 21. The tips 33, 34 of the arms 19, 20, respectively, produce a camming engagement with the eccentric slot 21 to force the tips into a position of engagement with the circular outwardly directed flange 38 of the base 11, best seen in FIG. 3. The eccentric notch or slot 21 is generated with respect to a point 23 which is displaced from the center 26 of the center of generation of the outer surface of the cover 10. Flange 38 engages a suitable O-ring 40 resting in a notch 41 in the inner surface of the cover 10 such that the O-ring 40 defines a fluid seal between the cover 10 and the body 11. FIG. 2 shows, in full lines, the locking ring 18 in its retracted or released position relative to the body 11 and shows, in dotted outline, the advanced or locked position 18a of the crescent ring 18. This view also shows, in dotted outline, the positions indicated as 33a, 34a showing the advanced or locking positions of the tips 33, 34, respectively. Advantageous, the tips 33, 34 are preferably 120° apart or less, such that rotation of the threaded member 12 causes the locking ring positively to engage the body 11 along three separate equally spaced lines. Stated in another manner, engagement will be produced between the crescent ring 18 and the body 11 along three segments or chords of a circumferential line which segments are substantially equally spaced around the periphery of the body 11.

Figure 3:
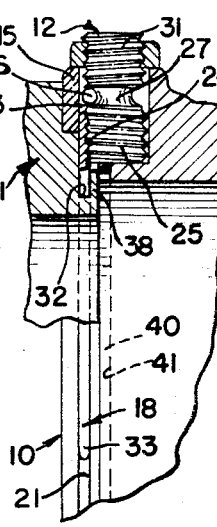
FIG. 3 is a partial view in section taken along the lines 3—3 of FIG. 2, and looking in the direction of the arrows and showing the locking device in unlocked position.
Figure 4:
FIG. 4 is a view in section similar to FIG. 3, except showing the locking device in a locked position.

FIG. 3 is a view in section, partly broken away, and taken along the lines 3—3 of FIG. 2 and looking in the direction of the arrows. In FIG. 3, the locking ring 18 is in a retracted or released position in which the outer edge 43 of the tongue 22 is in engagement with the locking pin 16. In this position, the cylindrical flange 38 of the body 11 will clear the inner surface of the locking ring 18 and the tips 33, 34 such that the cover 10 may be removed from the body 11. FIG. 4 is a view similar to FIG. 3 and showing the locking ring 18 in a locking position of engagement with the body 11. It is to be noted that in this position the threaded member or screw 12 has forced the tongue portion or the radial projection 22 to the right as viewed in FIG. 4 such that the ring 18 now substantially fills the slot 32 in the body 11 and is positioned between the outwardly directed flange 38 and the lower portion of the body 11. The tips 33, 34 shown in FIG. 2 have been moved to their positions indicated by 33a, 34a, respectively such that the locking ring 18 engages the body 11 at circumferentially spaced areas which extend for a substantial distance around the periphery of the body 11 securely to lock the body 11 in position with respect to the cover 10.

Thus it is seen that this embodiment has a positive locking and a positive unlocking action securely to engage or lock the pair of substantially concentric cylindrical members relative to each other and the locking ring cannot become accidentally unlocked but the locking ring can be quickly and easily moved between its locked and unlocked positions. Further the threaded member 12 may be quickly and easily locked in either of its positions by means of a locking nut or lock nut 13. U.S. Patent No. 3,089,517 illustrates a valve construction of the type in which the invention may be incorporated.

Figure 5:
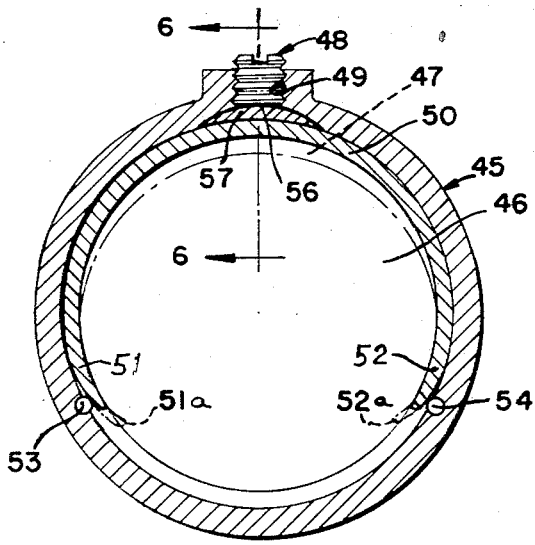
FIG. 5 is a view in section similar to the view depicted in FIG. 2, of another illustrative embodiment of this invention; and, FIG. 6 is a partial view in section taken along the line 6—6 of FIG. 5 and looking in the direction of the arrows.
Figure 6:
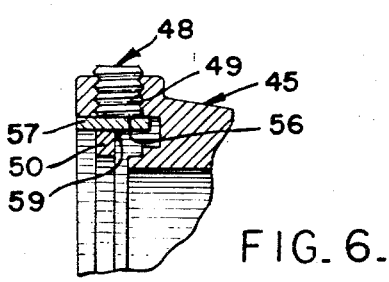

FIG. 5 shows another embodiment which is employed to secure a substantially circular cover 45 to a substantially circular body 46. Preferably the body 46 has a circular notch 47 therein which notch corresponds with the notch 32 of the embodiment of FIGS. 1 and 2. A threaded member 48 threadably engages a cylindrical aperture 49 of the cover 45. FIGS. 5 and 6 are views corresponding to FIGS. 2 and 3, respectively. In this embodiment the locking ring or crescent shaped locking member 50 has a substantialy circular configuration and the camming action of this locking ring is produced by the engagement of the arms 51, 52 of the locking ring 50 with a pair of camming pins 53, 54 respectively. Member 48 terminates in a substantially flat surface 56 which frictionally engages an arcuate plate 57. Preferably the arcuate plate 57 is secured to the body portion 58 of the locking ring 50 such as by welding as indicated at 59 in FIG. 6. The arcuate member 57 serves to distribute the radial force imparted by the locking nut 48 to the locking ring 50. When the locking nut 48 is rotated within this particular instance in a clockwise direction, the arms 51, 52 are forced beyond the pins 53, 54 to a position 51a, 52a, indicated in dotted outline in FIG. 5, such that the tips 51, 52 engage the notch 47. The locking motion or action of this embodiment is positive in the sense that it is positively produced by means of rotation of the member 48. The unlocking motion, however, of this embodiment is produced by the resilience of the locking ring 50, which resilience causes the ring to tend to assume its initial position in which the arms 51, 52 are in their solid line position as shown in FIG. 5.

From the foregoing explanation it will be apparent to those skilled in the art, that this locking device is very economical to construct, has a locking action which cannot be accidentally unlocked but which may be quickly and easily moved between locked and unlocked positions. Further, because of the camming action of the locking ring-slot engagement, the locking ring applies a locking force along segments of the periphery of one of the cylindrical members which segments are preferably equally spaced around the periphery of the inner cylindrical member. While two illustrative embodiments have been disclosed, it is understood that the concept thereof may be applied to other embodiments without departing from the spirit and the scope of this invention. For example, other devices may be employed to produce a cam-type blade-in-slot engagement securely to fasten an outer member having a generally cylindrical surface to an inner member having a portion which includes a substantially circular slot on the periphery.

What I claim is:

1. A locking device for a pair of concentric cylindrical members including a first outer cylindrical member and a second inner cylindrical member, the combination comprising: a crescent ring slidably mounted in a slot on the inner surface of said first cylindrical member; means for applying a radial force to said crescent ring; and, said means for applying a radial force to said cresent ring including means for applying a bidirectional radial force to said cresent ring, said means for applying a bidirectional force includes a threaded cylindrical member secured in said first cylindrical member against longitudinal translation and wherein said crescent ring includes a tongue having a threaded surface in frictional engagement with said threaded member.

2. A locking device for locking an outer first cylindrical member to a concentric inner cylindrical member, the combination comprising:

a crescent ring slidably mounted in an eccentric slot on the inner surface of said first cylindrical member;

a tongue depending radially from said crescent member and projecting through an aperture in said first cylindrical member; and means threadably engaging said tongue, said last mentioned means including a threaded screw and means retaining said threaded screw against axial movement while permitting rotation of said screw.

3. The combination according to claim 2 wherein said second cylindrical member has an annular notch therein positioned to receive at least a portion of said crescent ring.

4. The combination according to claim 3 wherein the arms of said crescent ring extend at least 240° around the periphery of said second cylindrical member whereby said ring engages said second cylindrical member along chords which are substantially equally spaced around the periphery of said second cylindrical member.

5. In a locking arrangement for locking a first member having a cylindrical inner surface to a concentric substantially cylindrical second member, the combination comprising:

an eccentric slot in said cylindrical surface of said first member;

a crescent locking ring slidably mounted in said slot and including a central portion and a pair of arms;

means for applying a radial force to said central portion; and a slot extending around the periphery of said inner cylindrical member for receiving spaced portions of said locking ring in blade-in-slot engagement in response to the application of a radial force to said ring, said means for applying a radial force to said locking ring includes a tongue portion on said ring and means threadably engaging said tongue portion for applying a radial force to said locking ring in either direction relative to the radius of curvature of said ring.

References Cited

UNITED STATES PATENTS

| | | | |
|---|---|---|---|
| 300,653 | 6/1884 | Sleeper | 285—81 |
| 1,668,921 | 5/1928 | Miks | 285—90 |
| 2,118,885 | 5/1938 | Hughes | 287—52.09 |
| 2,503,223 | 4/1950 | Stade | 24—278 |
| 2,901,269 | 8/1959 | Rickard | 285—308 |
| 2,934,963 | 5/1960 | Gribin et al. | 285—141 |

FOREIGN PATENTS

| | | |
|---|---|---|
| 928,134 | 11/1954 | Germany. |
| 1,001,047 | 6/1964 | Great Britain. |

CARL W. TOMLIN, *Primary Examiner.*

THOMAS F. CALLAGHAN, *Examiner.*

T. A. LISLE, *Assistant Examiner.*